US012561221B2

(12) United States Patent
Kistner et al.

(10) Patent No.: US 12,561,221 B2
(45) Date of Patent: Feb. 24, 2026

(54) TECHNIQUES FOR MANAGING PERFORMANCE METRICS ASSOCIATED WITH SOFTWARE APPLICATIONS

(71) Applicant: Apple Inc., Cupertino, CA (US)

(72) Inventors: Nicholas Kistner, Cupertino, CA (US);
Vivek Krishnan, San Jose, CA (US);
Andrew T. Maher, London (GB);
Fabio Benedetti, Santa Clara, CA (US);
Raymond T. Powers, Castro Valley,
CA (US); Ari K. Campbell-Marder,
San Francisco, CA (US); **Matthew Tan
Teik Hoe, London (GB); Gregory D.
Eldridge, Seattle, WA (US); Arseniy
Kaplun**, Scotts Valley, CA (US);
Daniela S. Antonova, York (GB); **Peter
J. Gremett**, Sunnyvale, CA (US)

(73) Assignee: Apple Inc., Cupertino, CA (US)

( * ) Notice: Subject to any disclaimer, the term of this
patent is extended or adjusted under 35
U.S.C. 154(b) by 154 days.

(21) Appl. No.: 18/322,449

(22) Filed: May 23, 2023

(65) Prior Publication Data

US 2024/0289246 A1    Aug. 29, 2024

Related U.S. Application Data

(60) Provisional application No. 63/486,998, filed on Feb.
26, 2023.

(51) Int. Cl.
G06F 11/34      (2006.01)
G06F 11/30      (2006.01)
G06F 11/32      (2006.01)

(52) U.S. Cl.
CPC ...... G06F 11/3428 (2013.01); G06F 11/3082
(2013.01); G06F 11/321 (2013.01)

(58) Field of Classification Search
None
See application file for complete search history.

(56) References Cited

U.S. PATENT DOCUMENTS

| | | | |
|---|---|---|---|
| 10,756,959 B1 * | 8/2020 | Makwarth | H04L 41/22 |
| 2005/0120111 A1 * | 6/2005 | Bailey | G06F 11/3409 |
| | | | 709/224 |

(Continued)

FOREIGN PATENT DOCUMENTS

| | | |
|---|---|---|
| EP | 3449414 A | 3/2019 |
| WO | 2017187207 A1 | 11/2017 |

OTHER PUBLICATIONS

European Patent Application 24157407.8—Extended European Search
Report dated Jul. 8, 2024.

*Primary Examiner* — Qing Chen
(74) *Attorney, Agent, or Firm* — DICKINSON WRIGHT
RLLP

(57)      ABSTRACT

Disclosed herein are techniques for providing comparative
performance metrics to software application developers.
One technique includes the steps of (1) obtaining respective
performance metrics for a plurality of software applications;
(2) receiving a request to display, for a particular software
application of the plurality of software applications, percen-
tile information associated with the respective performance
metric; (3) generating percentile performance metrics based
on at least some of the respective performance metrics; (4)
identifying, based on the percentile performance metrics, a
percentile range into which the respective performance
metric; and (5) outputting a user interface that includes: (i)
a first visual indication of the respective performance metric,
and (ii) a second visual indication of the percentile range
into which the respective performance metric falls, where (Continued)

the second visual indication obfuscates a point at which the respective performance metric falls within the percentile range.

19 Claims, 12 Drawing Sheets

(56)                    References Cited

U.S. PATENT DOCUMENTS

| | | | |
|---|---|---|---|
| 2007/0179791 A1* | 8/2007 | Ramesh | G06Q 10/06393 |
| | | | 705/7.39 |
| 2008/0140347 A1* | 6/2008 | Ramsey | G06Q 10/00 |
| | | | 702/180 |
| 2009/0066620 A1* | 3/2009 | Russell | G09G 3/3413 |
| | | | 345/88 |
| 2010/0229096 A1* | 9/2010 | Maiocco | H04L 41/064 |
| | | | 709/224 |
| 2011/0072353 A1* | 3/2011 | Le Pennec | H04L 41/0622 |
| | | | 715/737 |
| 2013/0173355 A1* | 7/2013 | Barcenas | G06Q 10/06393 |
| | | | 705/7.39 |
| 2014/0282422 A1 | 9/2014 | Tuffs et al. | |
| 2014/0325058 A1 | 10/2014 | Fletcher et al. | |
| 2015/0149850 A1* | 5/2015 | Leach | G06F 11/3452 |
| | | | 714/751 |
| 2015/0220420 A1* | 8/2015 | Boneti | G06F 11/3419 |
| | | | 714/37 |
| 2016/0239780 A1* | 8/2016 | Liljenquist | G06Q 10/06393 |
| 2017/0153962 A1* | 6/2017 | Biegun | G06F 11/3024 |
| 2017/0206451 A1* | 7/2017 | Mahler | G06N 20/00 |
| 2019/0065302 A1* | 2/2019 | Cosgrove | G06F 11/0754 |
| 2019/0370677 A1 | 12/2019 | Garvey et al. | |
| 2021/0019247 A1 | 1/2021 | Hurley et al. | |
| 2021/0173856 A1* | 6/2021 | Chitnis | G06F 21/6227 |
| 2023/0013797 A1* | 1/2023 | Rathod | G06F 11/3428 |

* cited by examiner

200

202

204

206

250

OBTAINING A RESPECTIVE PERFORMANCE METRIC OF THE SOFTWARE
APPLICATION
252

RECEIVING A REQUEST TO DISPLAY, FOR A PARTICULAR SOFTWARE
APPLICATION OF THE PLURALITY OF SOFTWARE APPLICATIONS,
PERCENTILE INFORMATION ASSOCIATED WITH THE RESPECTIVE
PERFORMANCE METRIC OF THE PARTICULAR SOFTWARE APPLICATION
254

GENERATING PERCENTILE PERFORMANCE METRICS BASED ON AT LEAST
SOME OF THE RESPECTIVE PERFORMANCE METRICS
256

IDENTIFYING, BASED ON THE PERCENTILE PERFORMANCE METRICS, A
PERCENTILE RANGE INTO WHICH THE RESPECTIVE PERFORMANCE
METRIC OF THE PARTICULAR SOFTWARE APPLICATION FALLS
258

OUTPUTTING A USER INTERFACE THAT INCLUDES:

(1) A FIRST VISUAL INDICATION OF THE RESPECTIVE PERFORMANCE
METRIC OF THE PARTICULAR SOFTWARE APPLICATION, AND (2) A SECOND VISUAL INDICATION OF THE PERCENTILE RANGE INTO
WHICH THE RESPECTIVE PERFORMANCE METRIC FALLS, WHERE THE
SECOND VISUAL INDICATION OBFUSCATES A POINT AT WHICH THE
RESPECTIVE PERFORMANCE METRIC FALLS WITHIN THE PERCENTILE
RANGE
260

*FIG. 2B*

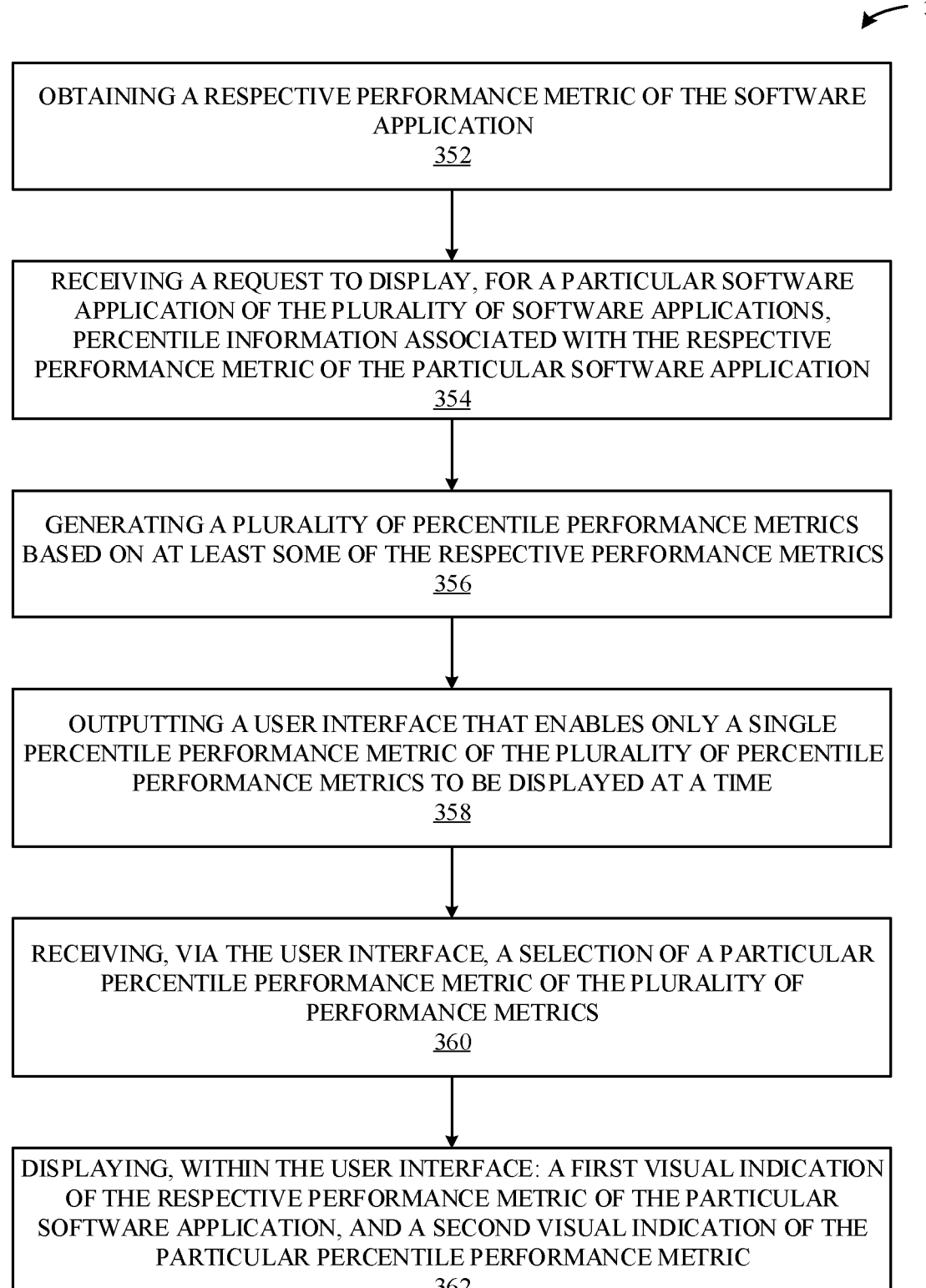

350

OBTAINING A RESPECTIVE PERFORMANCE METRIC OF THE SOFTWARE
APPLICATION
352

RECEIVING A REQUEST TO DISPLAY, FOR A PARTICULAR SOFTWARE
APPLICATION OF THE PLURALITY OF SOFTWARE APPLICATIONS,
PERCENTILE INFORMATION ASSOCIATED WITH THE RESPECTIVE
PERFORMANCE METRIC OF THE PARTICULAR SOFTWARE APPLICATION
354

GENERATING A PLURALITY OF PERCENTILE PERFORMANCE METRICS
BASED ON AT LEAST SOME OF THE RESPECTIVE PERFORMANCE METRICS
356

OUTPUTTING A USER INTERFACE THAT ENABLES ONLY A SINGLE
PERCENTILE PERFORMANCE METRIC OF THE PLURALITY OF PERCENTILE
PERFORMANCE METRICS TO BE DISPLAYED AT A TIME
358

RECEIVING, VIA THE USER INTERFACE, A SELECTION OF A PARTICULAR
PERCENTILE PERFORMANCE METRIC OF THE PLURALITY OF
PERFORMANCE METRICS
360

DISPLAYING, WITHIN THE USER INTERFACE: A FIRST VISUAL INDICATION
OF THE RESPECTIVE PERFORMANCE METRIC OF THE PARTICULAR
SOFTWARE APPLICATION, AND A SECOND VISUAL INDICATION OF THE
PARTICULAR PERCENTILE PERFORMANCE METRIC
362

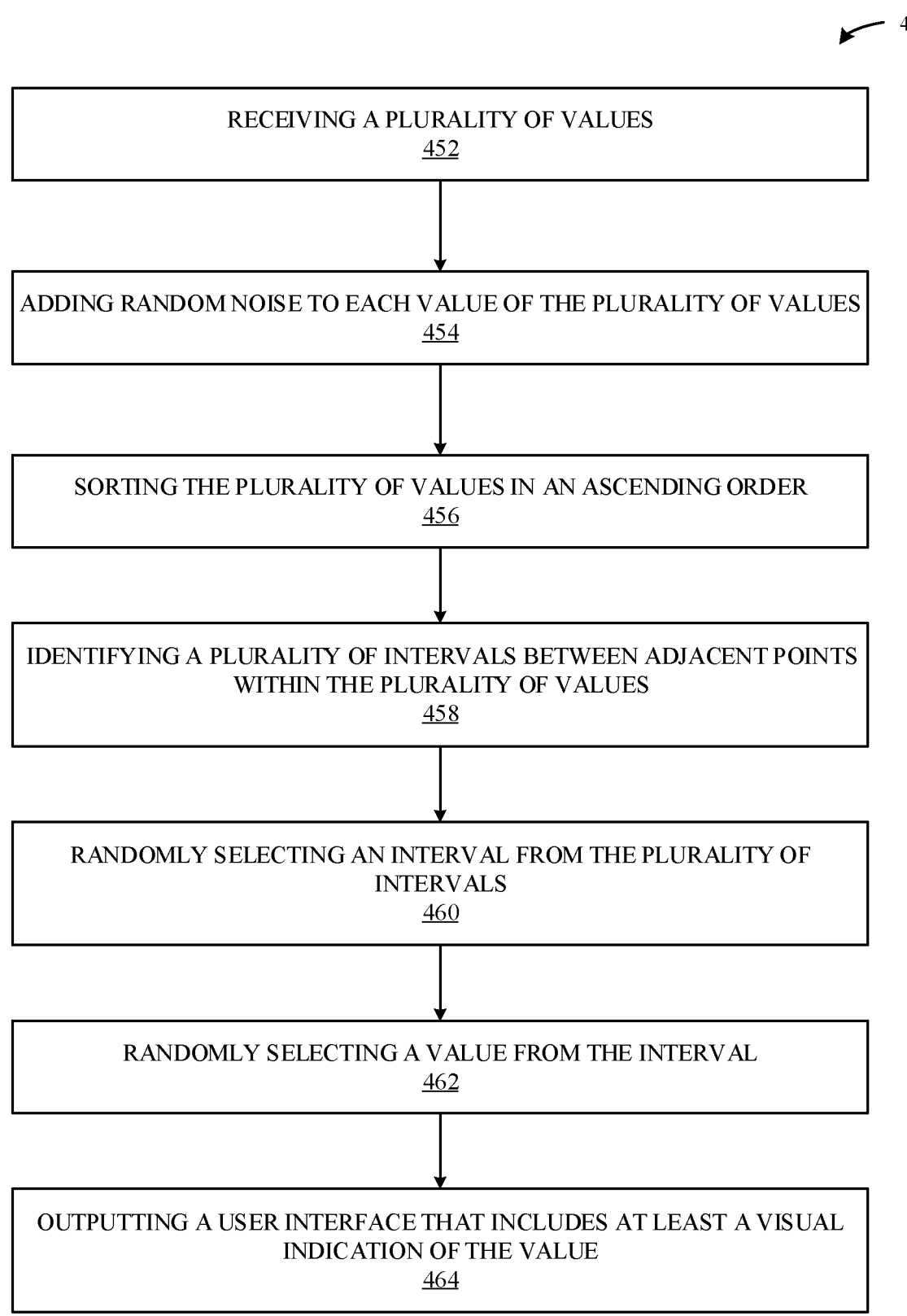

450

RECEIVING A PLURALITY OF VALUES
452

ADDING RANDOM NOISE TO EACH VALUE OF THE PLURALITY OF VALUES
454

SORTING THE PLURALITY OF VALUES IN AN ASCENDING ORDER
456

IDENTIFYING A PLURALITY OF INTERVALS BETWEEN ADJACENT POINTS
WITHIN THE PLURALITY OF VALUES
458

RANDOMLY SELECTING AN INTERVAL FROM THE PLURALITY OF
INTERVALS
460

RANDOMLY SELECTING A VALUE FROM THE INTERVAL
462

OUTPUTTING A USER INTERFACE THAT INCLUDES AT LEAST A VISUAL
INDICATION OF THE VALUE
464

*FIG. 4B*

TECHNIQUES FOR MANAGING PERFORMANCE METRICS ASSOCIATED WITH SOFTWARE APPLICATIONS

CROSS-REFERENCE TO RELATED APPLICATIONS

The present application claims the benefit of U.S. Provisional Application No. 63/486,998, entitled "TECHNIQUES FOR MANAGING PERFORMANCE METRICS ASSOCIATED WITH SOFTWARE APPLICATIONS," filed Feb. 26, 2023, the content of which is incorporated by reference herein in its entirety for all purposes.

FIELD

The described embodiments set forth techniques for managing performance metrics associated with software applications. In particular, the techniques involve providing comparative performance metrics to developers of the software applications in a manner that reflects privacy considerations of the developers, while ensuring they maintain an accurate understanding of their own metrics.

BACKGROUND

Recent years have shown a proliferation of software applications designed to operate on computing devices such as desktops, laptops, tablets, mobile phones, and wearable devices. This increase is primarily attributable to computing devices running operating systems that enable third-party software applications to be developed for and installed on the computing devices (alongside various native software applications that typically ship with the operating systems). This approach provides innumerable benefits, not least of which includes enabling the vast number of worldwide developers to exercise their creativity by using powerful application programming interfaces (APIs) that are available through the aforementioned operating systems.

It can be beneficial for developers to obtain performance analytics associated with their software applications. The performance metrics can include, for example, information about the number of downloads, number of active users, geographic location of users, frequency of usage, and other relevant metrics associated with the software applications. By analyzing this information, developers can gain insights into how users are interacting with their software applications and make informed decisions about software update strategies, marketing strategies, and so on.

SUMMARY

This Application sets forth techniques for managing performance metrics associated with software applications. In particular, the techniques involve providing comparative performance metrics to developers of the software applications in a manner that reflects privacy considerations of the developers, while ensuring they maintain an accurate understanding of their own metrics.

One embodiment sets forth a method for providing comparative performance metrics to developers of software applications. According to some embodiments, the method can be implemented by a computing device, and includes the steps of (1) for each software application of a plurality of software applications: obtaining a respective performance metric of the software application, (2) receiving a request to display, for a particular software application of the plurality of software applications, percentile information associated with the respective performance metric of the particular software application, (3) generating percentile performance metrics based on at least some of the respective performance metrics, (4) identifying, based on the percentile performance metrics, a percentile range into which the respective performance metric of the particular software application falls, and (5) outputting a user interface that includes: (i) a first visual indication of the respective performance metric of the particular software application, and (2) a second visual indication of the percentile range into which the respective performance metric falls, wherein the second visual indication obfuscates a point at which the respective performance metric falls within the percentile range.

Another embodiment sets forth another method for providing comparative performance metrics to developers of software applications. According to some embodiments, the method can be implemented by a computing device, and include the steps of (1) for each software application of a plurality of software applications: obtaining a respective performance metric of the software application, (2) receiving a request to display, for a particular software application of the plurality of software applications, percentile information associated with the respective performance metric of the particular software application, (3) generating a plurality of percentile performance metrics based on at least some of the respective performance metrics, (4) outputting a user interface that enables only a single percentile performance metric of the plurality of percentile performance metrics to be displayed at a time, (5) receiving, via the user interface, a selection of a particular percentile performance metric of the plurality of performance metrics, and (6) outputting, by the user interface: a first visual indication of the respective performance metric of the particular software application, and a second visual indication of the particular percentile performance metric.

Yet another embodiment sets forth another method for implementing data randomizations in a manner that eliminates duplicate values. According to some embodiments, the method can be implemented by a computing device, and include the steps of (1) receiving a plurality of values, (2) adding random noise to each value of the plurality of values, (3) sorting the plurality of values in an ascending order, (4) identifying a plurality of intervals between adjacent points within the plurality of values, (5) randomly selecting an interval from the plurality of intervals, (6) randomly selecting a value from the interval, and (7) outputting a user interface that includes at least a visual indication of the value.

Other embodiments include a non-transitory computer readable medium configured to store instructions that, when executed by a processor included in a computing device, cause the computing device to implement the methods and techniques described in this disclosure. Yet other embodiments include hardware computing devices that include processors that can be configured to cause the hardware computing devices to implement the methods and techniques described in this disclosure.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 2B illustrates a method for providing comparative performance metrics to developers of software applications, according to some embodiments.

FIG. 3F illustrates a method for providing comparative performance metrics to developers of software applications, according to some embodiments.

FIG. 4B illustrates a method for implementing data randomizations in a manner that eliminates duplicate values, according to some embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for providing performance metrics to developers who publish software applications through a software application store. In some embodiments, the techniques involve providing comparative performance metrics to developers of the software applications in a manner that reflects privacy considerations of the developers, while ensuring they maintain an accurate understanding of their own metrics.

Figure 1:
FIG. 1 illustrates a block diagram of different components of a system for implementing the various techniques described herein, according to some embodiments.
Figure 1:
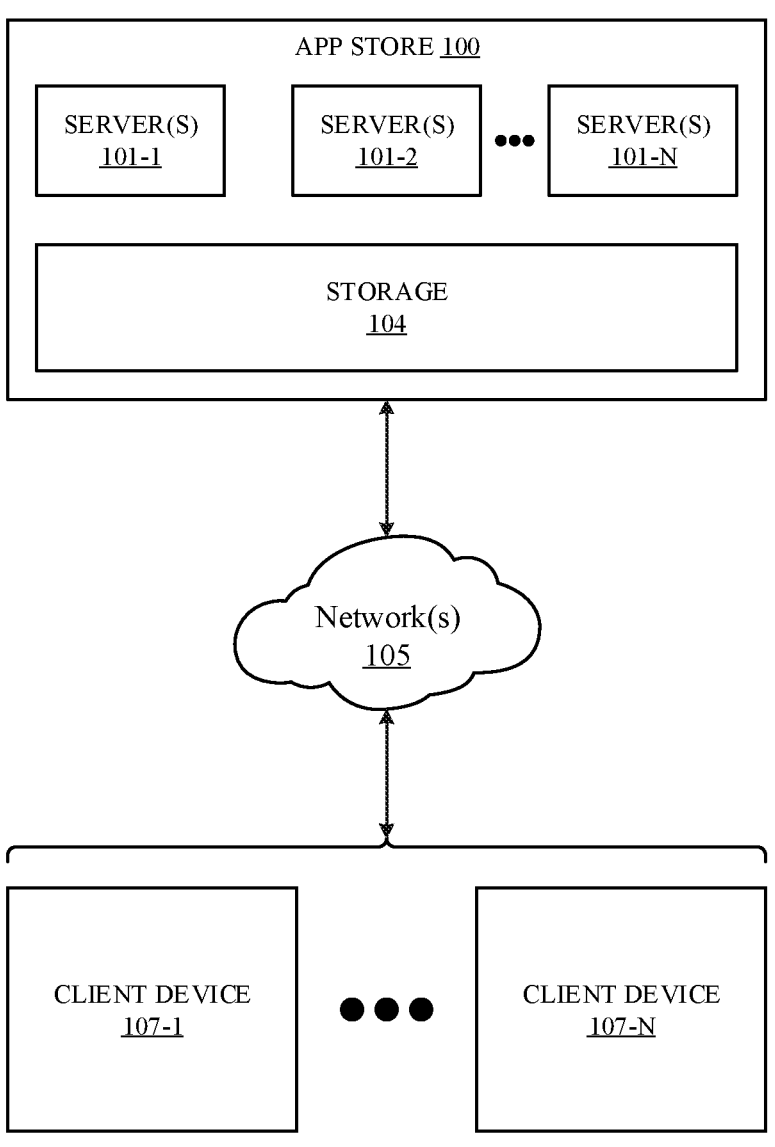

FIG. 1 illustrates a block diagram 50 of a system architecture through which a software application store 100 (also referred to herein as the "app store 100") can be implemented and accessed by users, software developers, etc., according to some embodiments. In particular, and as shown in FIG. 1, the app store 100 can be communicably connected to client devices 107 across one or more networks 105. As described herein, the app store 100 can enable users, using the client devices 107, to search for, download, and install the software applications. The app store 100 can also enable developers, using the client devices 107, to distribute software applications through the app store. The app store 100 can further enable the developers to access performance metrics associated with their software applications, as described in further detail herein.

According to some embodiments, the app store 100 can include one or more servers 101 that can implement the various techniques discussed below in conjunction with FIGS. 2A-2B, 3A-3F, and 4A-4B. According to some embodiments, the client devices 107 can be coupled to the servers 101 (and the app store 100 implemented thereon) by one or more networks 105 (e.g., the Internet). For example, the client devices 107 operated by users can send software application interaction data to the app store 100, such as search queries for software applications, requests to download software applications, information about user activity tied to software applications (e.g., launches, usage, deletions, etc.), requests to purchase software applications, and the like. In another example, client devices 107 operated by developers can upload software applications for distribution through the app store 100, issue requests for performance metrics, and the like.

According to some embodiments, the server(s) 101 can utilize a storage 104 (e.g., local storage devices, cloud storage services, etc.) to manage data structures that are appropriate for storing the aforementioned information and for calculating the performance metrics discussed herein. For example, the app store 100 can collect information from which performance metrics (monetization, usage, etc.) can be derived, store the information in the storage 104, and then calculate and provide performance metrics to the developers. In some embodiments, the app store 100 can determine performance metrics for groups of software applications. For example, a set of peer software applications (referred to herein as a "peer group") may be identified based on any number of commonalities, and performance metrics for the peer group can be provided to developers so that they are able to understand, at least to a certain extent, how their software application is performing relative to similar software applications.

Figure 2A:
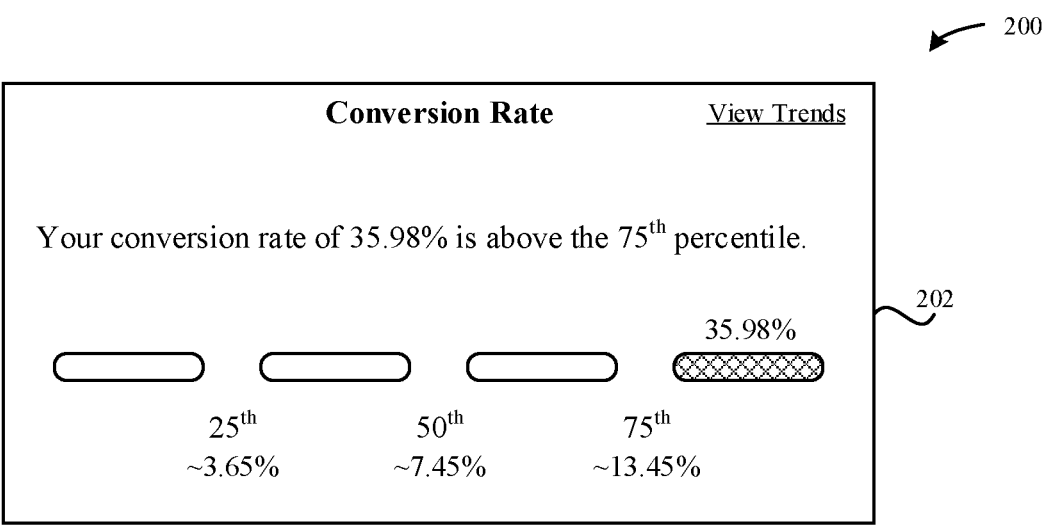
FIG. 2A illustrates a conceptual diagram of example user interfaces that provide comparative performance metrics to developers of software applications, according to some embodiments.

FIG. 2A illustrates a conceptual diagram 200 of example user interfaces that provide comparative performance metrics to developers of software applications, according to some embodiments. As shown in FIG. 2A, a user interface 202 can provide, to a developer of a given software application, information about how a conversion rate of the software application compares to the conversion rates of other software applications. The conversion rate can represent, for example, conversions of a free version of the software application to a paid version of the software application, advertisements for the software application that result in users downloading, installing, and/or utilizing the software application, and so on.

To provide the information, the server 101 first determines the conversion rate of the software application (35.98%, as shown in FIG. 2A). The server 101 also determines percentiles (e.g., $25^{th}$ percentile, $50^{th}$ percentile, $70^{th}$ percentile, etc.) based on the conversion rate of the software application and the conversion rates of other software applications. The other software applications can be selected, for example, based on one or more characteristics that are shared between the software application and the other software applications. Although not illustrated in FIG. 2A, the server 101 can apply any form/number of limitations when generating the afore-mentioned conversion rate and percentiles, such as quantity limitations, temporal limitations, categorical limitations, and so on.

As shown in FIG. 2A, the server 101 can include, within the user interface 202, the conversion rate of the software application, as the individual viewing the user interface 202 is presumably privileged to view the conversion rate. The user interface 202 also includes information derived from the determined percentiles, which includes four separate and distinct percentile ranges (e.g., $1^{st}$ to $24^{th}$ percentile, $26^{th}$ to $49^{th}$ percentile, $51^{st}$ to $74^{th}$ percentile, and $76^{th}$ to $99^{th}$ percentile). As shown in FIG. 2A, the user interface 202 visually indicates the percentile range (i.e., $76^{th}$ to $99^{th}$) into which the conversion rate (i.e., 35.98%) of the software application falls. However, the user interface 202 obfuscates the actual point at which the conversion rate falls within the percentile range. In particular, there is no visual indication, such as a point or a line within the percentile range that would otherwise indicate where the conversation rate falls within the percentile range. Additionally, the user interface 202 can display, between each of the percentile ranges, information about the values that separate the different percentile ranges. However, this information can be approximated to further obfuscate how the conversation rate compares to the different percentile ranges. In the user interface 202, the approximation is indicated by the user through the use of the tilde ("~") symbol; however, any approach for effectively conveying the approximation to the viewer can be utilized without departing from the scope of this disclosure.

Additionally, FIG. 2A illustrates user interfaces 204, 206 for displaying proceed and retention metrics associated with the software application. As shown in FIG. 2A, such metrics can be prepared and displayed under the same approach used to prepare and display the conversion rate metrics shown in the user interface 202.

Additionally, it is noted that the server 101 can perform any modifications to the various metrics prior to, during, or subsequent to the various operations performed herein. For example, the server 101 can be configured to apply at least one differential privacy operation to establish statistical noise within the metrics.

Figure 2A:
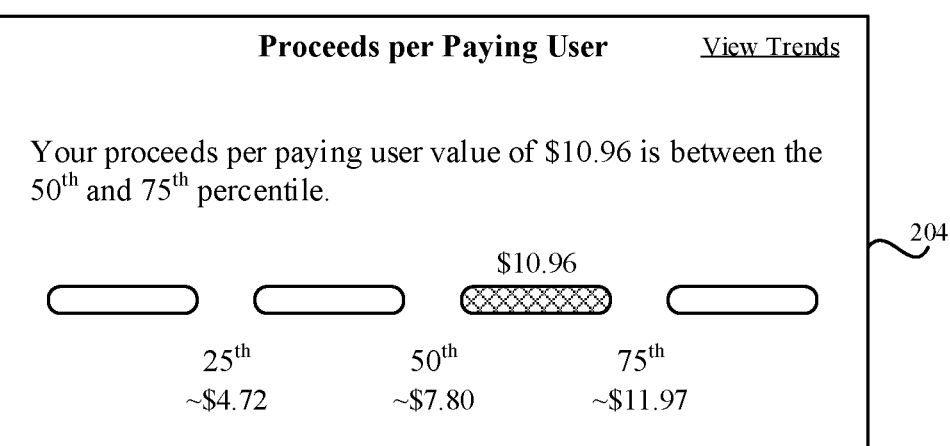
Figure 2A:
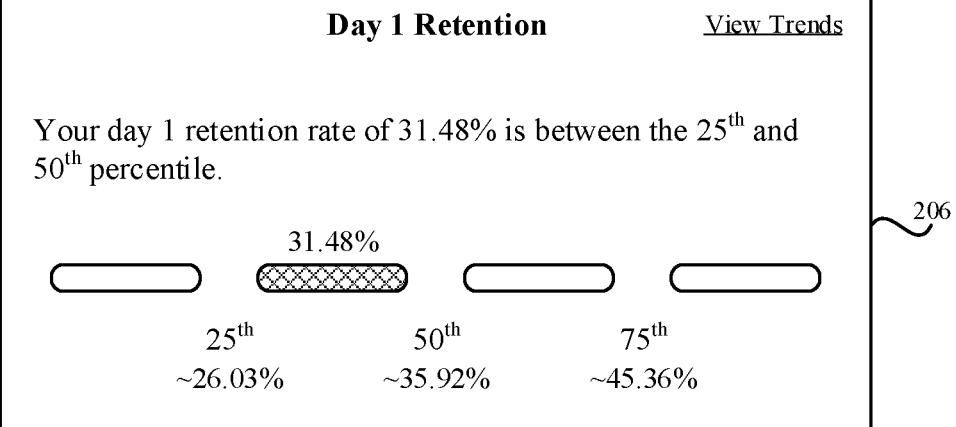

FIG. 2B illustrates a method 250 for providing comparative performance metrics to developers of software applications, according to some embodiments. As shown in FIG. 2, the method 250 begins at step 252, where the server 101 obtains a respective performance metric of the software application (e.g., as described above in conjunction with FIG. 2A).

At step 254, the server 101 receives a request to display, for a particular software application of the plurality of software applications, percentile information associated with the respective performance metric of the particular software application (e.g., as described above in conjunction with FIG. 2A). According to some embodiments, the performance metric of the particular software application pertains to: (i) downloads of the particular software application across computing devices, (ii) retention of the particular software application on computing devices, (iii) stability of the particular software application when it executes on computing devices, (iv) monetization of the particular software application, or (v) some combination thereof. Again, it is noted that the foregoing examples are not meant to be limiting, and that any metric associated with any aspect of the particular software application can be gathered, analyzed, determined, etc., without departing from the scope of this disclosure.

At step 256, the server 101 generates percentile performance metrics based on at least some of the respective performance metrics (e.g., as described above in conjunction with FIG. 2A). According to some embodiments, generating the percentile performance metrics based on at least some of the respective performance metrics involves applying, against the at least some of the respective performance metrics, at least one differential privacy operation to establish statistical noise within the at least some of the respective performance metrics.

At step 258, the server 101 identifies, based on the percentile performance metrics, a percentile range into which the respective performance metric of the particular software application falls (e.g., as described above in conjunction with FIG. 2A).

At step 260, the server 101 outputs a user interface that includes: (1) a first visual indication of the respective performance metric of the particular software application, and (2) a second visual indication of the percentile range into which the respective performance metric falls, where the second visual indication obfuscates a point at which the respective performance metric falls within the percentile range (e.g., as described above in conjunction with FIG. 2A). According to some embodiments, the user interface can further include: (3) a third visual indication of a second percentile range that is contiguous to the percentile range, and (4) a fourth visual indication of a value that separates respective endpoints of the percentile range and the second percentile range (e.g., as described above in conjunction with FIG. 2A). According to some embodiments, the value is approximated to obfuscate actual endpoint values of the percentile range and the second percentile range (e.g., as described above in conjunction with FIG. 2A). According to some embodiments, the user interface can further include a fifth visual indication that the value is approximated (e.g., as described above in conjunction with FIG. 2A).

According to some embodiments, obfuscating the point at which the respective performance metric falls within the percentile range comprises: (i) centering the first visual indication relative to the second visual indication, and (ii) shading the second visual indication to convey that the respective performance metric of the particular software application may fall anywhere within the percentile range (e.g., as described above in conjunction with FIG. 2A).

Figure 3A:
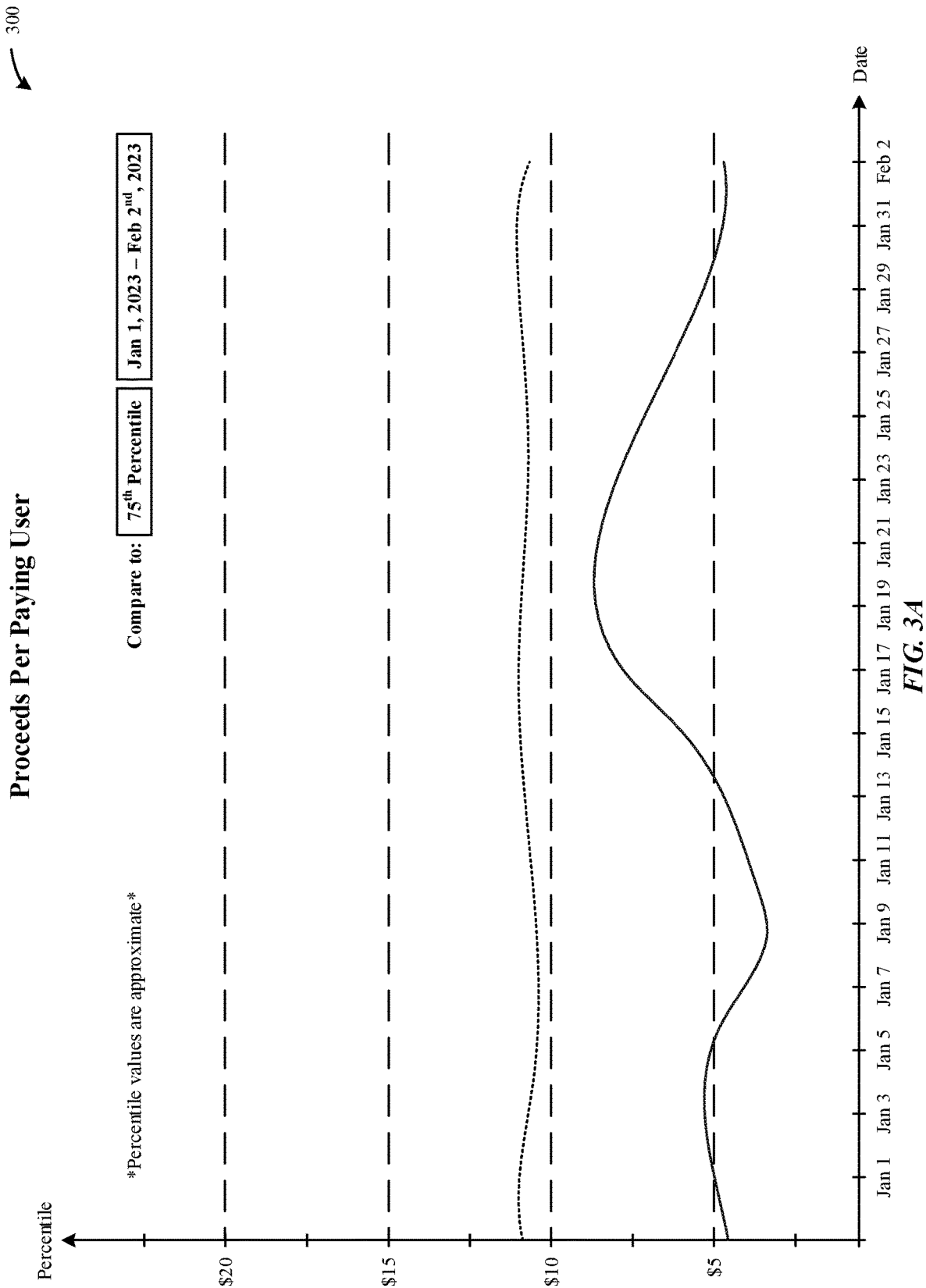
FIGS. 3A-3E illustrate conceptual diagrams of example user interfaces that provide comparative performance metrics to developers of software applications, according to some embodiments.
Figure 3B:
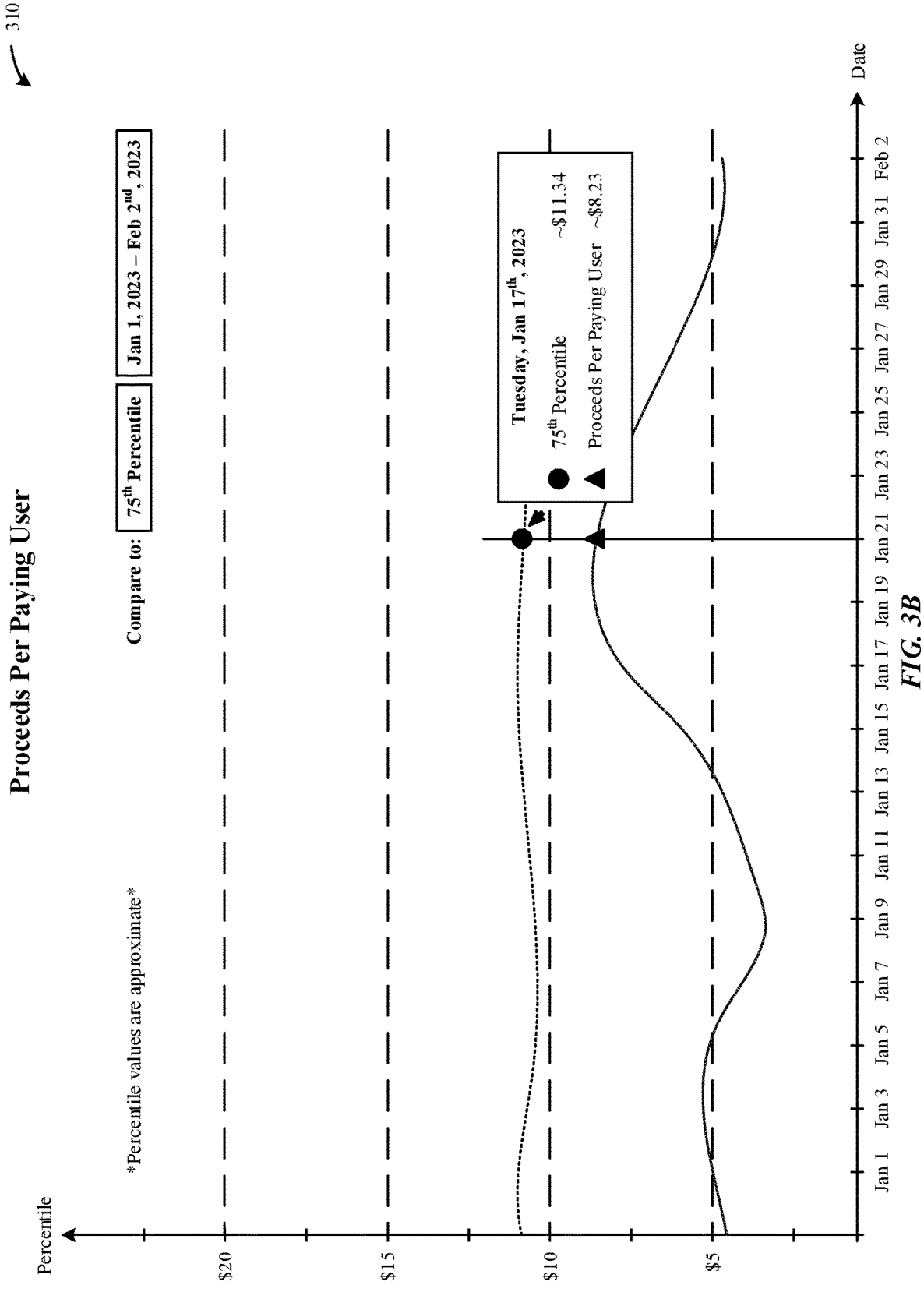
Figure 3C:
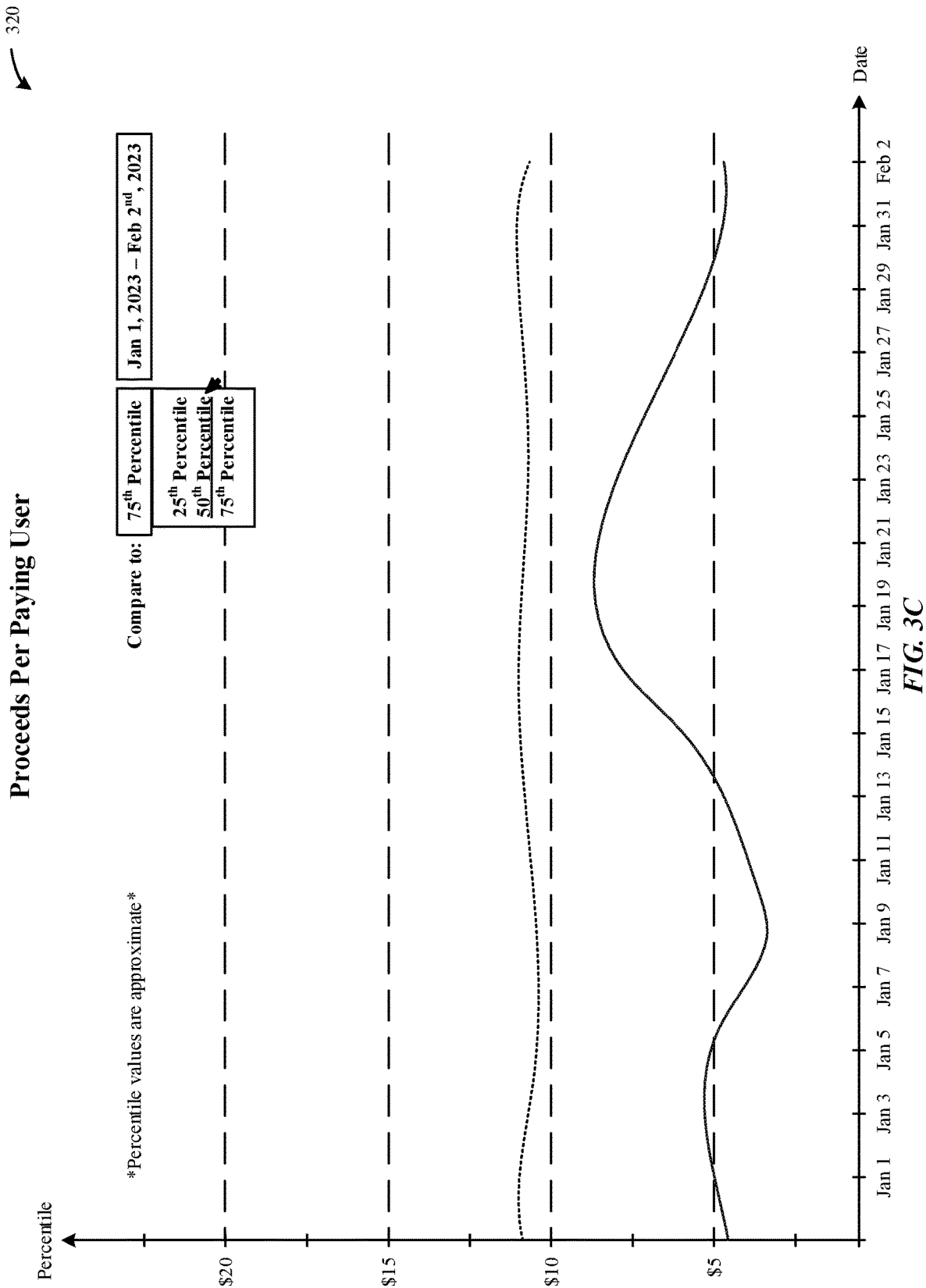

FIGS. 3A-3E illustrate conceptual diagrams of example user interfaces that provide comparative performance metrics to developers of software applications, according to some embodiments. As shown in FIG. 3A, a user interface 300 can provide, to a developer of a given software application, information about how a monetization metric—specifically, the average proceeds received from paying users of the software application—compares to the average proceeds (received from paying users) of other software applications. The average proceeds can represent, for example, an average of the total amount received per user, an average of the amount received from each user annually, monthly, weekly, etc., and so on. It is noted that the foregoing examples are not meant to be limiting, and that the techniques disclosed herein can apply to any performance metric, at any level of granularity, without departing from the scope of this disclosure.

To provide the information, the server 101 first determines the average proceeds of the software application through a selected time span (Jan. 1, 2023, through Feb. 2, 2023, as shown in FIG. 3A). The server 101 also determines a selected percentile (e.g., the $75^{th}$ percentile, as shown in FIG. 3A) based on the average proceeds of the software application and the average proceeds of other software applications through the selected time span. The other software applications can be selected, for example, based on one or more characteristics that are shared between the software application and the other software applications. Although not illustrated in FIG. 3A, the server 101 can apply any form/number of limitations when generating the aforementioned average proceeds and percentiles, such as quantity limitations, temporal limitations, categorical limitations, and so on.

As shown in FIG. 3A, the server 101 can include, within the user interface 300, a two-dimensional graph, where an x-axis of the graph corresponds to the selected time span, and the y-axis of the graph corresponds to the average proceeds. As shown in FIG. 3A, the axes can be constrained and demarcated based on the respective values/ranges intended to be represented by the axes. Additionally, the graph can include a first graphical line (illustrated in FIG. 3A as the dotted line) that represents the values for the selected percentile in relation to the selected time span. The graph can also include a second graphical line (illustrated in FIG. 3A as the solid line) that represents the values for the average proceeds of the software application in relation to the selected time span. The user interface 300 can also include an indication that the percentile values are approximate to obfuscate how the average proceeds compare to the selected percentile.

Additionally, the user interface 300 can enable a user to select and view specific values of the average proceeds/ selected percentile. This notion is illustrated in the user interface 310 of FIG. 3B, where a cursor-based input is detected along the first graphical line that represents the selected percentile. In response, the user interface 310 displays the specific value of the selected percentile that corresponds to the position of the cursor. The user interface 310 also displays the specific value of the average proceeds that corresponds to the position of the cursor. In this manner, the user can obtain an understanding of how the average proceeds of the software application compared to the selected percentile at a given moment of time.

Additionally, the user interface 310 can enable the user to select and view information for a different percentile. This notion is illustrated in the user interface 320 of FIG. 3C, where a cursor-based input involves selecting a different percentile (e.g., the $50^{th}$ percentile in FIG. 3C). In turn, the server 101 determines the selected different percentile based on the average proceeds of the software application and the average proceeds of other software applications through the selected time span. Again, the server 101 can apply any form/number of limitations when generating the aforementioned average proceeds and percentiles, such as quantity limitations, temporal limitations, categorical limitations, and so on.

Figure 3D:
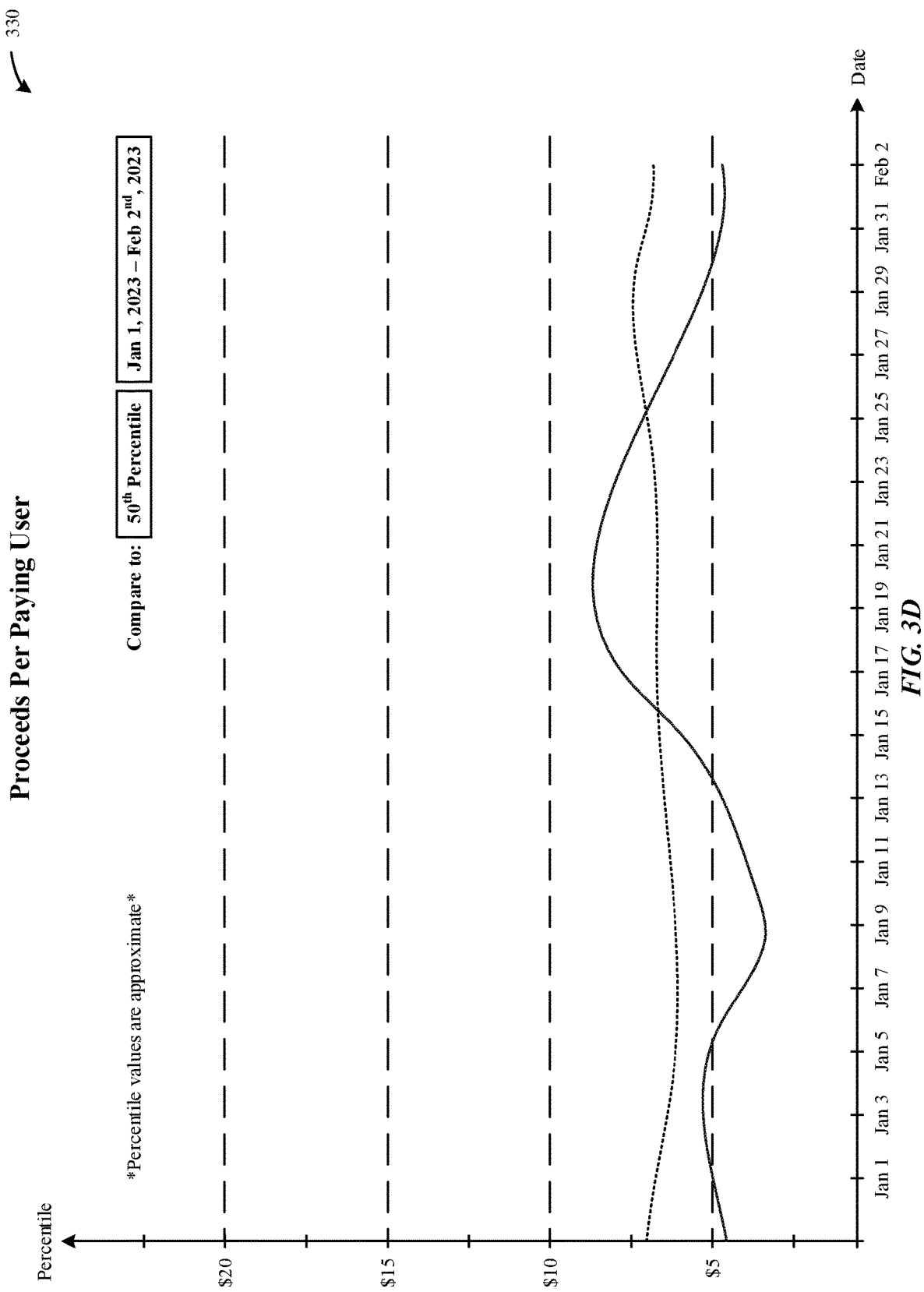
Figure 3E:
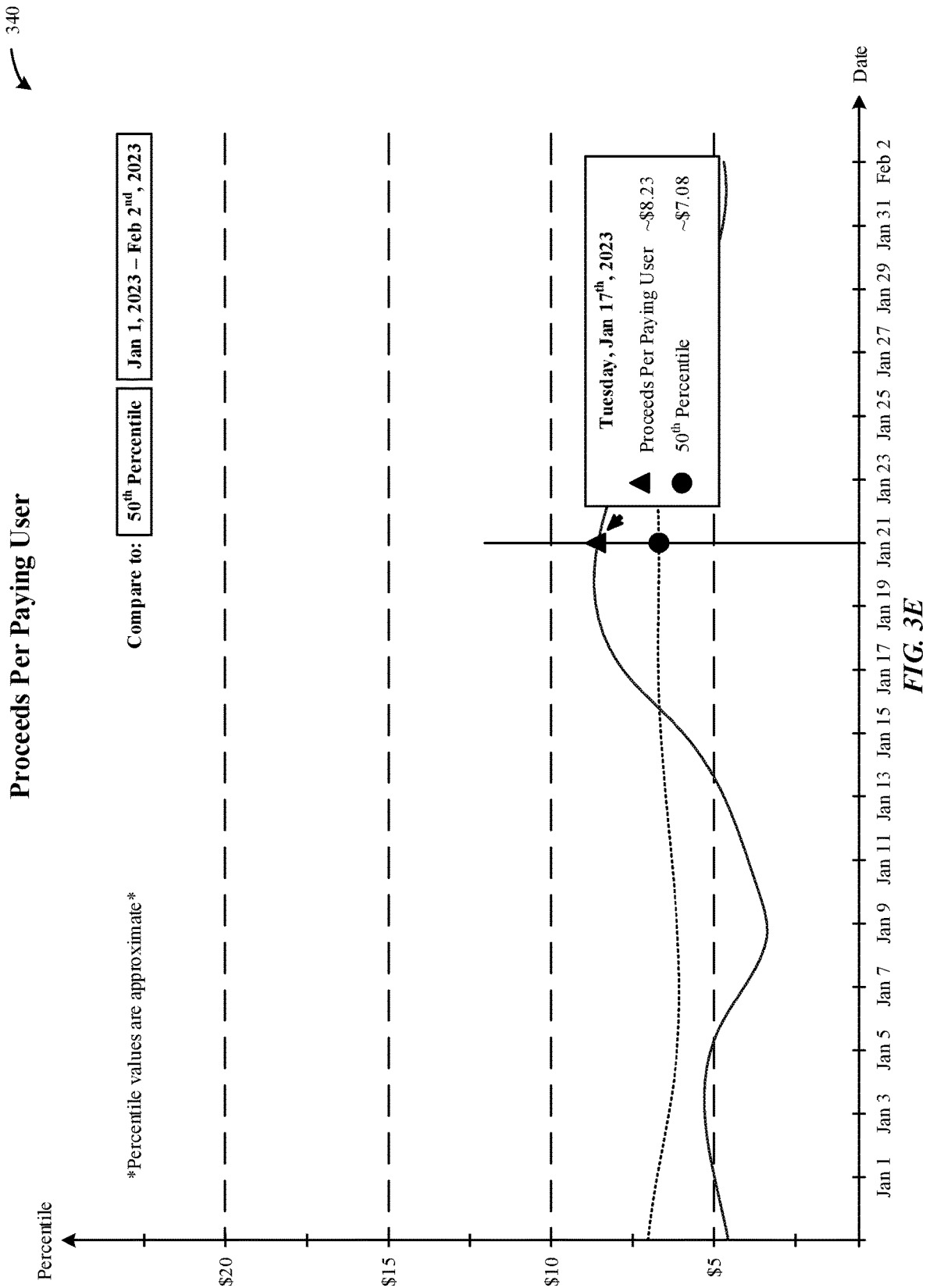

In turn, and as shown in the user interface 330 of FIG. 3D, the two-dimensional graph is updated to display information pertaining to the average proceeds of the software application and the selected different percentile (in the same manner described above in conjunction with FIG. 3A). As shown in FIG. 3D, first graphical line (illustrated in FIG. 3D as the dotted line) that represents the values for the selected percentile in relation to the selected time span is distinct from the first graphical line displayed in FIGS. 3A-3C (to reflect the selection of the $50^{th}$ percentile instead of the $75^{th}$ percentile). However, the second graphical line (illustrated in FIG. 3D as the solid line) that represents the values for the average proceeds in relation to the selected time span remains unchanged relative to the second graphic line displayed in FIGS. 3A-3C (as the average proceeds remain unaffected by the selection of the different percentile).

Additionally, the user interface 330 can enable a user to select and view specific values of the average proceeds/ selected percentile. This notion is illustrated in the user interface 340 of FIG. 3E, where a cursor-based input is detected along the second graphical line that represents the average proceeds. In response, the user interface 340 displays the specific value of the average proceeds that corresponds to the position of the cursor. The user interface 340 also displays the specific value of the selected percentile that corresponds to the position of the cursor. In this manner, the user can obtain an understanding of how the average proceeds of the software application compared to the selected percentile at a given moment of time.

Accordingly, enabling users to select and view information for only a single percentile at a time (as opposed to two or more percentiles at a time) can help avoid situations where users are likely to form false inferences through uninformed comparisons of their performance metrics to the percentiles.

Again, it is noted that the server 101 can perform any modifications to the various metrics prior to, during, or subsequent to the various operations performed herein. For example, the server 101 can be configured to apply at least one differential privacy operation to establish statistical noise within the metrics.

FIG. 3F illustrates a method 350 for providing comparative performance metrics to developers of software applications, according to some embodiments. As shown in FIG. 3F, the method 350 begins at step 352, where the server 101 obtains a respective performance metric of the software application (e.g., as described above in conjunction with FIGS. 3A-3E).

At step 354, the server 101 receives a request to display, for a particular software application of the plurality of software applications, percentile information associated with the respective performance metric of the particular software application (e.g., as described above in conjunction with FIGS. 3A-3E).

At step 356, the server 101 generates a plurality of percentile performance metrics based on at least some of the respective performance metrics (e.g., as described above in conjunction with FIGS. 3A-3E). According to some embodiments, generating the plurality of percentile performance metrics based on at least some of the respective performance metrics comprises: applying, against the at least some of the respective performance metrics, at least one differential privacy operation to establish statistical noise within the at least some of the respective performance metrics (e.g., as described above in conjunction with FIGS. 3A-3E).

At step 358, the server 101 outputs a user interface that enables only a single percentile performance metric of the plurality of percentile performance metrics to be displayed at a time (e.g., as described above in conjunction with FIGS. 3A-3E).

At step 360, the server 101 receives, via the user interface, a selection of a particular percentile performance metric of the plurality of performance metrics (e.g., as described above in conjunction with FIGS. 3A-3E). According to some embodiments, the performance metric of the particular software application pertains to (i) downloads of the particular software application across computing devices, (ii) retention of the particular software application on computing devices, (iii) stability of the particular software application when it executes on computing devices, (iv) monetization of the particular software application, or (v) some combination thereof (e.g., as described above in conjunction with FIGS. 3A-3E).

At step 362, the server 101 outputs, by the user interface: a first visual indication of the respective performance metric of the particular software application, and a second visual indication of the particular percentile performance metric (e.g., as described above in conjunction with FIGS. 3A-3E). According to some embodiments, the method 350 can further include (1) receiving an input that corresponds to a particular area of the first visual indication or the second visual indication, (2) extracting, from the respective performance metric of the particular software application, a first value that is based on the particular area, (3) extracting, from the particular percentile performance metric, a second value that is based on the particular area, and (4) outputting, by the user interface, third and fourth visual indications of the first and second values, respectively (e.g., as described above in conjunction with FIGS. 3A-3E).

According to some embodiments, each of (i) the respective performance metric of the particular software application, and (ii) the particular percentile performance metric, is constrained to a matching time span (e.g., as described above in conjunction with FIGS. 3A-3E). According to some embodiments, the time span is defined by at least one input received via the user interface (e.g., as described above in conjunction with FIGS. 3A-3E). According to some embodiments, the user interface can include a two-dimensional graph, where (i) an x-axis of the two-dimensional graph corresponds to the time span, and (ii) a y-axis of the two-dimensional graph corresponds to a range of values that is based on the respective performance metric of the particular software application and the particular percentile performance metric (e.g., as described above in conjunction with FIGS. 3A-3E).

Figure 4A:
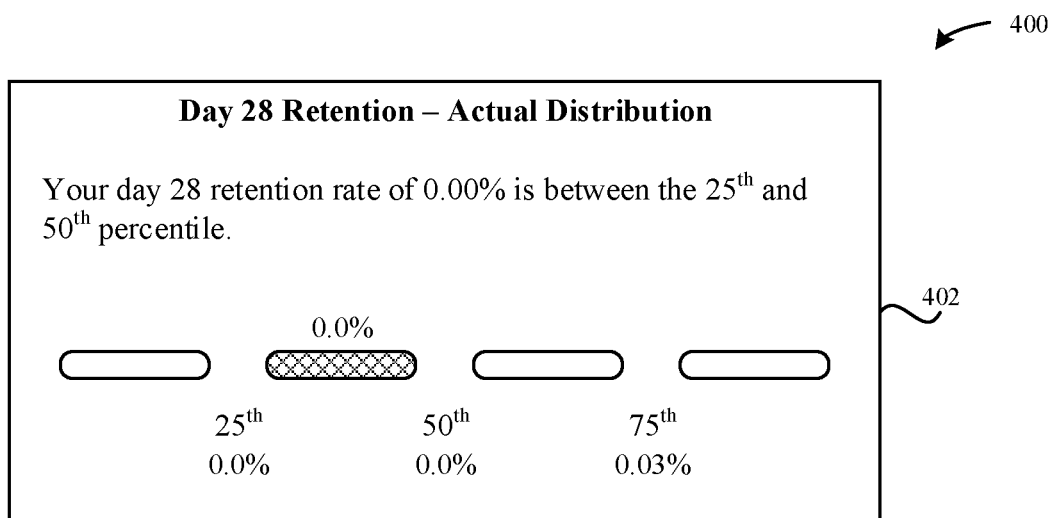
FIG. 4A illustrates a conceptual diagram of example user interfaces that (1) indicate how adding statistical noise to a set of performance metrics might otherwise result in inaccurate information being displayed to users, and (2) how such inaccuracies can be avoided (by employing the techniques discussed herein), according to some embodiments.
Figure 4A:
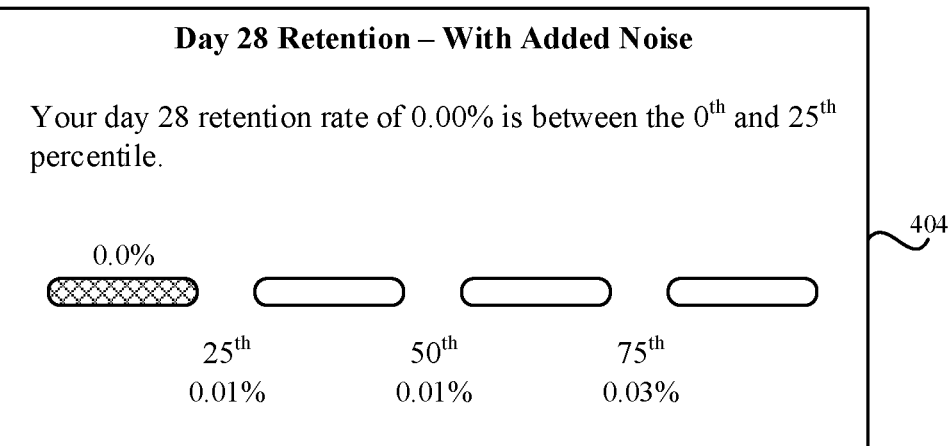
Figure 4A:
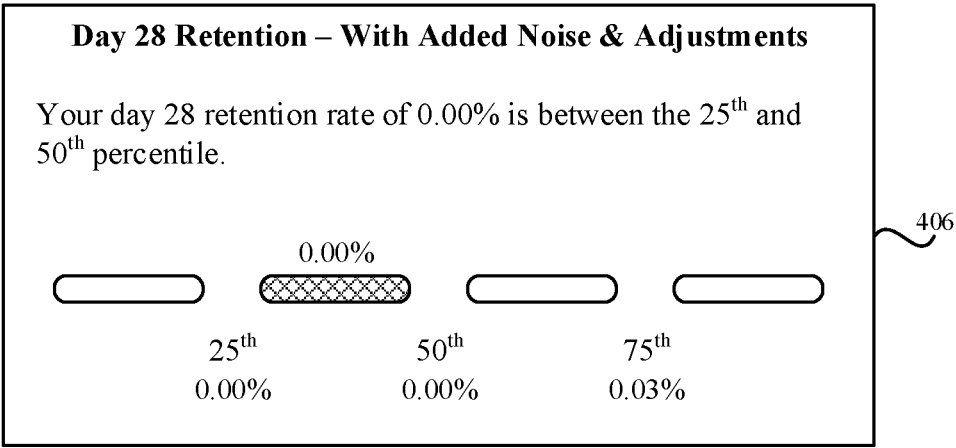

FIG. 4A illustrates a conceptual diagram 400 of example user interfaces that (1) indicate how adding statistical noise to a set of performance metrics might otherwise result in inaccurate information being displayed to users, and (2) how such inaccuracies can be avoided (by employing the techniques discussed herein), according to some embodiments. As shown in FIG. 4A, a user interface 402—which reflects the data-visualization techniques discussed above in conjunction with FIGS. 2A-2B—is configured to display 28-day retention data about a particular software application (i.e., the average percentage of users who launched the software application within 28 days of installing the software application). In particular, the user interface 402 illustrates the actual (i.e., true) distribution of the 28-day retention data relative to the different percentile ranges included in the user interface 402. As shown in the user interface 402, the actual distribution of the 28-day retention rate—which is 0.00%)—falls within the $25^{th}$ and $50^{th}$ percentile (which, as discussed herein, can be determined by the server 101 through comparing the $28^{th}$ day retention data of the software application to 28-day retention data associated with other similar software applications).

As described herein, it can be desirable to apply differential privacy operations against the performance metrics to establish statistical noise within the metrics to address privacy considerations. One differential privacy technique can involve the following approach: (1) sorting all data in ascending order, (2) looking at all intervals between adjacent points, (3) randomly picking one of these intervals, in a manner where it is more likely to pick (i) a larger interval, and (ii) an interval that is near to the one containing the target percentile (e.g., the 50th percentile), and (4) randomly picking a single value from the interval selected in step (3). This single value can be the "noised" version of the target percentile that is ultimately displayed to the user (e.g., developer) seeking to view a particular performance metric against the target percentile.

Unfortunately, the foregoing differential privacy technique can be problematic when the performance metrics contain duplicate values. In particular, the duplicate values can lead to intervals having a "zero-width" in step (2) of the foregoing differential privacy technique. Additionally, in step (3) of the foregoing differential privacy technique, it can be impossible to select a zero-width interval. In this regard, if the target percentile is a duplicate value, it may not be selected.

Importantly, several performance metrics contain a large proportion of duplicate values. For example, a very large number of software applications exhibit a crash-rate of exactly zero—in fact, in many cases, more than half of the software applications in a given peer group exhibit such a zero crash-rate. In this regard, if the foregoing differential privacy technique were utilized to generate, for example, performance metrics for the $25^{th}$ and $50^{th}$ percentiles, then such software applications would receive a non-zero value. This leads to incorrect results because the shown non-zero percentile constitutes an inaccurate representation of the true percentile. An example of this error/issue is captured in the user interface 404 illustrated FIG. 4A.

To avoid this outcome (illustrated in the user interface 404 and described herein), the foregoing differential privacy technique can be modified to exploit the fact that the performance metrics typically displayed are rounded to a certain precision (e.g., two decimal places for crash rate performance metrics). In particular, an initial step of adding random noise to each metric value can be implemented prior to step (1) of the foregoing differential privacy technique. According to some embodiments, the noise can be of a magnitude several scales smaller than the shown precision of the target percentile. In this manner, the adjusted (i.e., noised) performance metrics may not contain truly duplicate values. As a result, zero-width intervals may not exist in step (2) of the foregoing differential privacy technique, and it will be possible to select an interval containing the target percentile. In other words, with the foregoing added initial step, even if the target percentile is a duplicate value in the original dataset, it can still be selected as the shown percentile. An example of this benefit is captured in the user interface 406 illustrated in FIG. 4A, which provides the same (accurate) information included in the user interface 402 described herein. A breakdown of the modified forego-ing differential privacy is described below in conjunction with FIG. 4B.

FIG. 4B illustrates a method 450 for implementing data randomizations in a manner that eliminates duplicate values, according to some embodiments. As shown in FIG. 4B, the method 450 begins at step 452, where the server 101 receives a plurality of values (e.g., as described above in conjunction with FIG. 4A). At step 454, the server 101 adds random noise to each value of the plurality of values (e.g., as described above in conjunction with FIG. 4A). According to some embodiments, the random noise is of a magnitude that is several scales smaller than a precision of the target percentile (e.g., as described above in conjunction with FIG. 4A).

At step 456, the server 101 sorts the plurality of values in an ascending order (e.g., as described above in conjunction with FIG. 4A). At step 458, the server 101 identifies a plurality of intervals between adjacent points within the plurality of values (e.g., as described above in conjunction with FIG. 4A).

At step 460, the server 101 randomly selects an interval from the plurality of intervals (e.g., as described above in conjunction with FIG. 4A). According to some embodi-ments, randomly selecting the interval comprises: applying a bias toward selecting a larger interval and an interval that is closest to a target percentile (e.g., as described above in conjunction with FIG. 4A). At step 462, the server 101 randomly selects a value from the interval (e.g., as described above in conjunction with FIG. 4A). At step 464, the server 101 outputs a user interface that includes at least a visual indication of the value (e.g., as described above in conjunc-tion with FIG. 4A).

Figure 5:
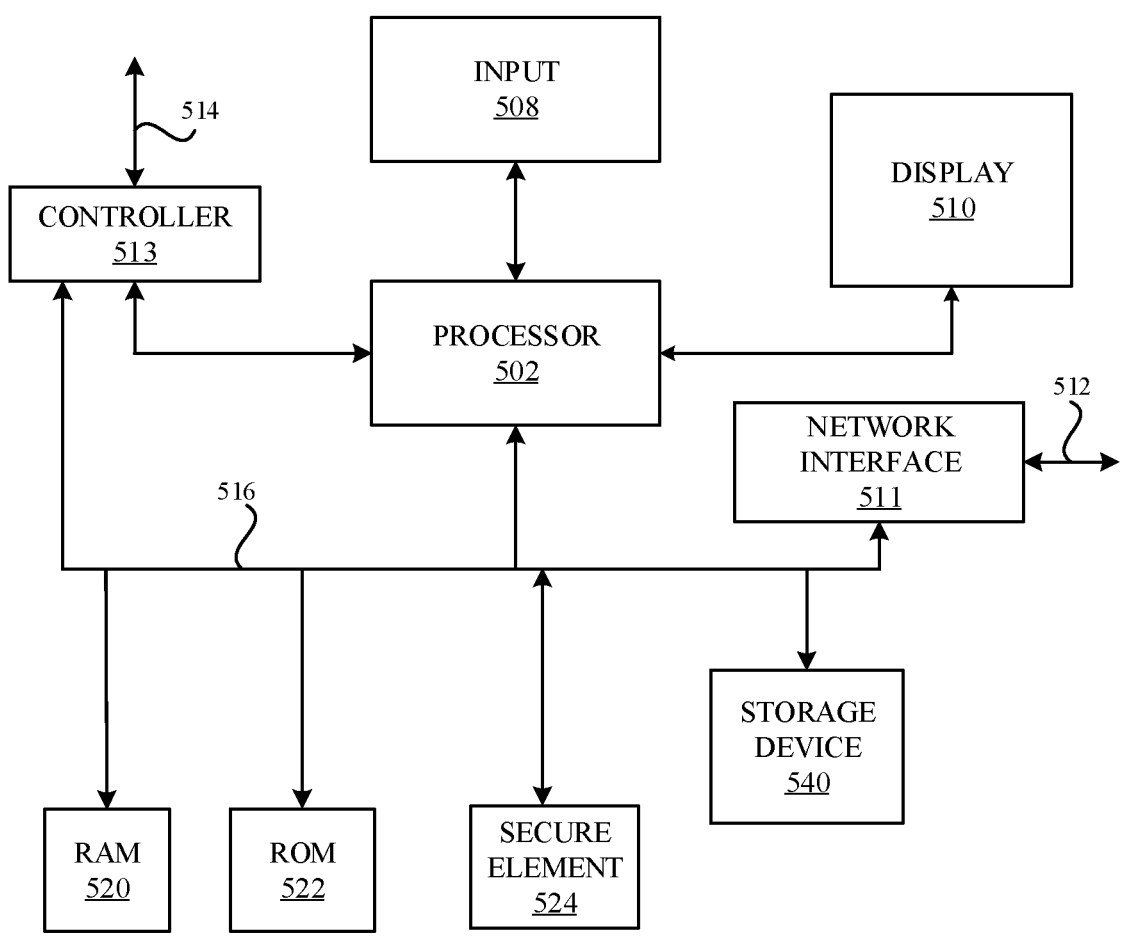
FIG. 5 illustrates a detailed view of a representative computing device that can be used to implement various methods described herein, according to some embodiments.

FIG. 5 illustrates a detailed view of a representative computing device 500 that can be used to implement various methods described herein, according to some embodiments. In particular, the detailed view illustrates various compo-nents that can be included in one or more computing devices illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image cap-ture input interface, input in the form of sensor data, etc. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that communica-tively couples to a data link 512. In the case of a wireless connection, the network/bus interface 511 can include a wireless transceiver.

The computing device 500 also includes a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities, or processes to be executed in a non-volatile manner. The RAM 520 can provide volatile data storage, and stores instructions related to the operation of the computing device 500. The computing device 500 can further include a secure element (SE) 524 for cellular wireless system access by the computing device 500.

The various aspects, embodiments, implementations or features of the described embodiments can be used sepa-rately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be dis-tributed over network-coupled computer systems so that the computer readable code is stored and executed in a distrib-uted fashion.

Regarding the present disclosure, it is well understood that the use of personally identifiable information should follow privacy policies and practices that are generally recognized as meeting or exceeding industry or governmen-tal requirements for maintaining the privacy of users. In particular, personally identifiable information data should be managed and handled so as to minimize risks of uninten-tional or unauthorized access or use, and the nature of authorized use should be clearly indicated to users.

The foregoing description, for purposes of explanation, used specific nomenclature to provide a thorough under-standing of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

In the foregoing description, numerous specific details are set forth, such as specific configurations, properties, and processes, etc., in order to provide a thorough understanding of the embodiments. In other instances, well-known pro-cesses and manufacturing techniques have not been described in particular detail in order to not unnecessarily obscure the embodiments. Reference throughout this speci-fication to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not nec-essarily referring to the same embodiment. Furthermore, the particular features, structures, configurations, or character-istics may be combined in any suitable manner in one or more embodiments.

In the following description and claims, the terms "coupled" and "connected," along with their derivatives, may be used. It should be understood that these terms are not intended as synonyms for each other. "Coupled" is used herein to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program may be stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel, rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense, rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

As described above, one aspect of the present technology involves gathering and utilizing data from various sources to provide, to developers, insightful analytics about their software applications. The present disclosure contemplates that in some instances, this gathered data may include personal information data that uniquely identifies or can be used to contact or locate a specific person. Such personal information data can include demographic data, location-based data, telephone numbers, email addresses, social networking handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine certain app store metrics. Accordingly, use of such personal information data enables users to have more streamlined and meaningful experience with the app store and software applications hosted by the app store. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized software application information pages, the present technology can be configured to allow users to select to "opt in" or "opt out" of participation in the collection of personal information data during registration for services or anytime thereafter. In another example, users can select not to provide their content and other personal information data for improved content sharing suggestion services. In yet another example, users can select to limit the length of time their personal information data is maintained by a third party, limit the length of time into the past from which content sharing suggestions may be drawn, and/or entirely prohibit the development of a knowledge graph or other metadata profile. In addition to providing "opt in" and "opt out" options, the present disclosure contemplates providing notifications relating to the access or use of personal information. For instance, a user may be notified upon downloading a software application that their personal information data will be accessed and then reminded again just before personal information data is accessed by the software application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for sharing to users by inferring preferences based on non-personal information data or a bare minimum amount of personal information, such as the quality level of the content (e.g., focus, exposure levels, etc.) or the fact that certain content is being requested by a device associated with a contact of the user, other non-personal information available to the app store, or publicly available information.

As used in the description above and the claims below, the phrases "at least one of A, B, or C" and "one or more of A, B, or C" include A alone, B alone, C alone, a combination of A and B, a combination of B and C, a combination of A and C, and a combination of A, B, and C. That is, the phrases "at least one of A, B, or C" and "one or more of A, B, or C" means A, B, C, or any combination thereof, such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B, and/or C" is equal to "at least one of A, B, or C." Also, the use of "a" refers to "one or more" in the present disclosure. For example, "an application" refers to "one application" or "a group of applications."

What is claimed is:

1. A method for providing comparative performance metrics to developers of software applications, executed by a computing device, the method comprising:

for ones of a plurality of software applications utilized by one or more client devices:

obtaining a respective performance metric for a particular software application of the plurality of software applications;

receiving a request to display, for the particular software application of the plurality of software applications, percentile information associated with the respective performance metric for the particular software application of the plurality of software applications;

generating a plurality of percentile performance metrics based on one or more of a plurality of additional respective performance metrics for the particular software application of the plurality of software applications;

identifying, based on the plurality of percentile performance metrics, a first percentile range into which the respective performance metric for the particular software application of the plurality of software applications falls;

outputting a user interface that includes a first visual indication of the respective performance metric for the particular software application of the plurality of software applications, and a second visual indication of the first percentile range into which the respective performance metric for the particular software application of the plurality of software applications falls, wherein the second visual indication of the first percentile range obfuscates a point at which the respective performance metric for the particular software application of the plurality of software applications falls within the first percentile range;

receiving an input that corresponds to a particular area of the first visual indication of the respective performance metric for the particular software application of the plurality of software applications or the second visual indication of the first percentile range;

extracting, from the respective performance metric for the particular software application of the plurality of software applications, a first value that is based on the particular area of the first visual indication of the respective performance metric for the particular software application of the plurality of software applications or the second visual indication of the first percentile range;

extracting, from a particular percentile performance metric of the plurality of percentile performance metrics, a second value that is based on the particular area of the first visual indication of the respective performance metric for the particular software application of the plurality of software applications or the second visual indication of the first percentile range;

outputting, by the user interface, a third visual indication and a fourth visual indication of the first and second values, respectively; and enabling, by the user interface, a user of the computing device to select and view specific values of the first percentile range.

2. The method of claim 1, wherein:

the third visual indication indicates a second percentile range that is contiguous to the first percentile range; and the fourth visual indication indicates a value that separates respective endpoints of the first percentile range and the second percentile range.

3. The method of claim 2, wherein the value is determined to obfuscate actual endpoint values of the first percentile range and the second percentile range.

4. The method of claim 3, wherein the user interface includes:

a fifth visual indication that the value is determined.

5. The method of claim 1, wherein obfuscating the point at which the respective performance metric for the particular software application of the plurality of software applications falls within the first percentile range comprises:

centering the first visual indication relative to the second visual indication, and shading the second visual indication to convey that the respective performance metric for the particular software application of the plurality of software applications falls within the first percentile range.

6. The method of claim 1, wherein generating the plurality of percentile performance metrics based on the one or more of the plurality of additional respective performance metrics for the particular software application of the plurality of software applications comprises:

applying, against the one or more of the plurality of additional respective performance metrics for the particular software application of the plurality of software applications, at least one differential privacy operation to establish statistical noise within the one or more of the plurality of additional respective performance metrics for the particular software application of the plurality of software applications.

7. The method of claim 1, wherein the respective performance metric for the particular software application of the plurality of software applications pertains to:

downloads of the particular software application of the plurality of software applications across computing devices, retention of the particular software application of the plurality of software applications on computing devices, stability of the particular software application of the plurality of software applications during execution on the one or more client devices, monetization of the particular software application of the plurality of software applications, or one or more combinations thereof.

8. A method for providing comparative performance metrics to developers of software applications, the method, executed by a computing device, comprising:

for ones of a plurality of software applications utilized by one or more client devices:

obtaining a respective performance metric for a particular software application of the plurality of software applications;

receiving a request to display, for the particular software application of the plurality of software applications, percentile information associated with the respective performance metric for the particular software application of the plurality of software applications;

generating a plurality of percentile performance metrics based on one or more of a plurality of additional respective performance metrics for the particular software application of the plurality of software applications;

outputting a user interface that enables only a single percentile performance metric of the plurality of percentile performance metrics to be displayed at a time;

receiving, via the user interface, a selection of a particular percentile performance metric of the plurality of percentile performance metrics;

outputting, by the user interface, a first visual indication of the respective performance metric for the particular software application of the plurality of software applications, and a second visual indication of the particular percentile performance metric of the plurality of percentile performance metrics;

receiving an input that corresponds to a particular area of the first visual indication of the respective performance metric for the particular software application of the plurality of software applications or the second visual indication of the particular percentile performance metric of the plurality of percentile performance metrics;

extracting, from the respective performance metric for the particular software application of the plurality of software applications, a first value that is based on the particular area of the first visual indication of the respective performance metric for the particular software application of the plurality of software applications or the second visual indication of the particular percentile performance metric of the plurality of percentile performance metrics;

extracting, from the particular percentile performance metric of the plurality of percentile performance metrics, a second value that is based on the particular area of the first visual indication of the respective performance metric for the particular software application of the plurality of software applications or the second visual indication of the particular percentile performance metric of the plurality of percentile performance metrics;

outputting, by the user interface, a third visual indication and a fourth visual indication of the first and second values, respectively; and enabling, by the user interface, a user of the computing device to select and view specific values of the particular percentile performance metric of the plurality of percentile performance metrics.

9. The method of claim 8, wherein each of (i) the respective performance metric for the particular software application of the plurality of software applications, and (ii) the particular percentile performance metric of the plurality of percentile performance metrics, is constrained to a matching time span.

10. The method of claim 9, wherein the matching time span is defined by at least one input received via the user interface.

11. The method of claim 9, wherein:

the user interface includes a two-dimensional graph, an x-axis of the two-dimensional graph corresponds to the matching time span, and a y-axis of the two-dimensional graph corresponds to a range of values that is based on the respective performance metric for the particular software application of the plurality of software applications and the particular percentile performance metric of the plurality of percentile performance metrics.

12. The method of claim 8, wherein generating the plurality of percentile performance metrics based on the one or more of the plurality of additional respective performance metrics for the particular software application of the plurality of software applications comprises:

applying, against the one or more of the plurality of additional respective performance metrics for the particular software application of the plurality of software applications, at least one differential privacy operation to establish statistical noise within the one or more of the plurality of additional respective performance metrics for the particular software application of the plurality of software applications.

13. The method of claim 8, wherein the respective performance metric for the particular software application of the plurality of software applications pertains to:

downloads of the particular software application of the plurality of software applications across computing devices, retention of the particular software application of the plurality of software applications on computing devices, stability of the particular software application of the plurality of software applications during execution on the one or more client devices, monetization of the particular software application of the plurality of software applications, or one or more combinations thereof.

14. A computer system comprising:

a processor circuit; and a non-transitory computer readable medium storing instructions that, when executed by the processor circuit, cause the computer system to perform operations comprising:

for ones of a plurality of software applications utilized by one or more client devices:

obtaining a respective performance metric for a particular software application of the plurality of software applications;

receiving a request to display, for the particular software application of the plurality of software applications, percentile information associated with the respective performance metric for the particular software application of the plurality of software applications;

generating a plurality of percentile performance metrics based on one or more of a plurality of additional respective performance metrics for the particular software application of the plurality of software applications;

outputting a user interface that enables only a single percentile performance metric of the plurality of percentile performance metrics to be displayed at a time;

receiving, via the user interface, a selection of a particular percentile performance metric of the plurality of percentile performance metrics;

outputting, by the user interface, a first visual indication of the respective performance metric for the particular software application of the plurality of software applications, and a second visual indication of the particular percentile performance metric of the plurality of percentile performance metrics;

receiving an input that corresponds to a particular area of the first visual indication of the respective performance metric for the particular software application of the plurality of software applications or the second visual indication of the particular percentile performance metric of the plurality of percentile performance metrics;

extracting, from the respective performance metric for the particular software application of the plurality of software applications, a first value that is based on the particular area of the first visual indication of the respective performance metric for the particular software application of the plurality of software applications or the second visual indication of the particular percentile performance metric of the plurality of percentile performance metrics;

extracting, from the particular percentile performance metric of the plurality of percentile performance metrics, a second value that is based on the particular area of the first visual indication of the respective performance metric for the particular software application of the plurality of software applications or the second visual indication of the particular percentile performance metric of the plurality of percentile performance metrics;

outputting, by the user interface, a third visual indication and a fourth visual indication of the first and second values, respectively; and enabling, by the user interface, a user of the computing device to select and view specific values of the particular percentile performance metric of the plurality of percentile performance metrics.

15. The computer system of claim 14, wherein each of (i) the respective performance metric for the particular software application of the plurality of software applications, and (ii) the particular percentile performance metric of the plurality of percentile performance metrics, is constrained to a matching time span.

16. The computer system of claim 15, wherein the matching time span is defined by at least one input received via the user interface.

17. The computer system of claim 15, wherein:

the user interface includes a two-dimensional graph, an x-axis of the two-dimensional graph corresponds to the matching time span, and a y-axis of the two-dimensional graph corresponds to a range of values that is based on the respective performance metric for the particular software application of the plurality of software applications and the particular percentile performance metric of the plurality of percentile performance metrics.

18. The computer system of claim 15, wherein generating the plurality of percentile performance metrics based on the one or more of the plurality of additional respective performance metrics for the particular software application of the plurality of software applications comprises:

applying, against the one or more of the plurality of additional respective performance metrics for the particular software application of the plurality of software applications, at least one differential privacy operation to establish statistical noise within the one or more of the plurality of additional respective performance metrics for the particular software application of the plurality of software applications.

19. The computer system of claim 15, wherein the respective performance metric for the particular software application of the plurality of software applications pertains to:

downloads of the particular software application of the plurality of software applications across computing devices, retention of the particular software application of the plurality of software applications on computing devices, stability of the particular software application of the plurality of software applications during execution on the one or more client devices, monetization of the particular software application of the plurality of software applications, or one or more combinations thereof.

* * * * *